(12) United States Patent
Wei et al.

(10) Patent No.: US 7,973,798 B2
(45) Date of Patent: Jul. 5, 2011

(54) INVERSE TEXTURE SYNTHESIS

(75) Inventors: Li-Yi Wei, Redwood City, CA (US);
Kun Zhou, Beijing (CN); Jianwei Han, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 12/059,041

(22) Filed: Mar. 31, 2008

(65) Prior Publication Data

US 2009/0244083 A1 Oct. 1, 2009

(51) Int. Cl.
*G09G 5/00* (2006.01)
(52) U.S. Cl. ............................ 345/582; 345/418; 382/285
(58) Field of Classification Search .................. 345/582, 345/586–588, 418; 382/285
See application file for complete search history.

(56) References Cited

U.S. PATENT DOCUMENTS

| | | | |
|---|---|---|---|
| 5,526,446 A | 6/1996 | Adelson | |
| 5,784,498 A | 7/1998 | Venable | |
| 5,933,148 A | 8/1999 | Oka | |
| 6,005,582 A | 12/1999 | Gabriel | |
| 6,271,847 B1 | 8/2001 | Shum | |
| 6,281,904 B1 | 8/2001 | Reinhardt | |
| 6,762,769 B2 | 7/2004 | Guo et al. | |
| 6,999,095 B2 | 2/2006 | Wang et al. | |
| 7,023,447 B2 | 4/2006 | Luo et al. | |
| 7,149,368 B2 * | 12/2006 | Tong et al. | 382/285 |
| 7,161,601 B2 | 1/2007 | Zhang et al. | |

OTHER PUBLICATIONS

Li-Yi Wei, "Deterministic Texture Analysis and Synthesis using Tree Structure Vector Quantization", Oct. 1999, XII Brazillian Symposium on Computer Graphics and Image Processing, p. 207-213.*
Ashikhmin, M., Synthesizing natural textures, Proc. of ACM Symposium on Interactive 3D Graphics, Mar. 2001, pp. 217-226, ACM Press, New York, NY, USA.
Avidan, S., A. Shamir, Seam carving for content-aware image resizing, ACM Transactionson Graphics, Jul. 2007, vol. 26 No. 3, pp. 10-13, ACM Press, New York, NY, USA.
Bargteil, A. W., F. Sin, J. E. Michaels, T. G. Goktekin, and J. F. O'Brien, A texture synthesis method for liquid animations, Proc. of the ACM SIGGRAPH Eurographics Symposium on Comp. Animation, Sep. 2006, pp. 345-351, Eurographics Association, Aire-la-Ville, Switzerland.
Brooks, S., and N. Dodgson, Self-similarity based texture editing, ACM Transactions on Graphics, Jul. 2002, pp. 653-656, vol. 21, No. 3, ACM Press, New York, NY, USA.

(Continued)

*Primary Examiner* — Xiao M Wu
*Assistant Examiner* — Yingchun He
(74) *Attorney, Agent, or Firm* — Lyon & Harr, LLP; Mark A. Watson

(57) ABSTRACT

A "texture generator" uses an inverse texture synthesis solution that runs in the opposite direction to traditional forward synthesis techniques to construct 2D texture compactions for use by a graphics processing unit (GPU) of a computer system. These small 2D texture compactions generally summarize an original globally variant texture or image, and are used to reconstruct the original texture or image, or to re-synthesize new textures or images under user-supplied constraints. In various embodiments, the texture generator uses the texture compaction to provide real-time synthesis of globally variant textures on a GPU, where texture memory is generally too small for large textures. Further, the texture generator provides an optimization framework for inverse texture synthesis which ensures that each input region is properly encoded in the output compaction. In addition, the texture generator also computes orientation fields for anisotropic textures containing both low- and high-frequency regions.

20 Claims, 6 Drawing Sheets

OTHER PUBLICATIONS

Cabral. B., L. C. Leedom, Imaging vector fields using line integral convolution, Proceedings of the 20th Annual Conf. on Comp. Graphics and Interactive Techniques, Aug. 1993, pp. 263-270, ACM Press, New York, NY, USA.

Cohen, M., J. Shade, S. Hiller, and O. Deussen, Wang tiles for image and texture generation, ACM SIGGRAPH, Jul. 2003, pp. 287-294, vol. 22, No. 3, ACM Press, New York, NY, USA.

Drori I., D. Cohen-Or, Y. Yeshurun, Fragment-based image completion, ACM Transactions on Graphics, Jul. 2003, pp. 303-312. vol. 22, No. 3, ACM Press, New York, NY, USA.

Efros, A. A. and W. T. Freeman, Image quilting for texture synthesis and transfer, Proceedings of ACM SIGGRAPH, Aug. 2001, pp. 341-346, ACM Press, New York, NY, USA.

Efros, A.A. and T. K. Leung, Texture synthesis by non-parametric sampling, Proc. of Int'l Conf. on Comp. Vision, Sep. 1999, pp. 1033-1038, vol. 2, IEEE Computer Society, Washington, DC, USA.

Fang, H., J. C. Hart Textureshop: texture synthesis as a photograph editing tool, Aug. 2004, Int'l Conf. on Comp. Graphics and Interactive Techniques, pp. 354-359, ACM Press, New York, NY, USA.

Gu, J., C.-I. Tu, R. Ramamoorthi, P. Belhumeur, W. Matusik, S. Nayar, Time-varying surface appearance: Acquisition, modeling and rendering, Int'l Conf. on Comp. Graphics and Interactive Techniques, pp. 762-771, Jul.-Aug. 2006, ACM Press, New York, NY, USA.

Haenselmann, T., W. Effelsberg, Texture resynthesis using principle component analysis, Human Vision and Electronic Imaging VII, May 30, 2002, pp. 440-447, vol. 4662, Society of Photo-Optical Instrumentation Engineers.

Han, J., K. Zhou, L-Y. Wei, M. Gong, H. Bao, X. Zhang, and B. Guo, Fast example-based surface texture synthesis via discrete optimization, The Visual Computer, Sep. 2006, pp. 918-925, vol. 22, No. 9-11, Springer Berlin / Heidelberg.

Hanrahan, P., and P. Haeberli, Direct WYSIWYG painting and texturing on 3D shapes, ACM SIGGRAPH Comp. Graphics, Aug. 1990, pp. 215-223, vol. 24, No. 4, ACM Press, New York, NY, USA.

Heeger, D. J., and J. R. Bergen, Pyramid-based texture analysis/synthesis, Proceedings of the 22nd Annual Conf. on Comp. Graphics and Interactive Techniques, Aug. 1995, pp. 229-238, ACM Press, New York, NY, USA.

Hertzmann, A., C. E. Jacobs, N. Oliver, B. Curless, D. H. Salesin, Image analogies, Proc. of the 28th Annual Conf. on Comp. Graphics and Interactive Techniques, pp. 327-340, Aug. 2001, ACM Press, New York, NY, USA.

Jojic N., B. J. Frey, A. Kannan, Epitomic analysis of appearance and shape, Proc. of the Ninth IEEE Int'l Conf. on Comp. Vision, Oct. 2003, pp. 34-41, IEEE Computer Society, Washington, DC, USA.

Kannan, A., J. Winn and C. Rother, Clustering appearance and shape by learning jigsaws, Advances in Neural Information Processing Systems, Dec. 4-7, 2006, pp. 657-664, MIT Press.

Kopf, J., C.-W. Fu, D. Cohen-Or, O. Deussen, D. Lischinski and T.-T. Wong, Solid texture synthesis from 2D exemplars, ACM Transactions on Graphics, Aug. 2007, vol. 26, No. 3, pp. 2:1-2:9, ACM Press, New York, NY, USA.

Kwatra V., I. Essa, A. Bobick, and N. Kwatra, Texture optimization for example-based synthesis, ACM Transactions on Graphics, Jul. 2005, pp. 795-802, vol. 24, No. 3, ACM Press, New York, NY, USA.

Kwatra, V., D. Adalsteinsson, T. Kim, N. Kwatra, M. Carlson, and M. Lin, Texturing Fluids, Proc. IEEE Transactions on Visualization and Comp. Graphics, Sep. 2007, pp. 939-952, vol. 13 No. 5., IEEE Computer Society, Washington, DC, USA.

Lefebvre, S., and H. Hoppe, Parallel controllable texture synthesis, ACM Trans. on Graphics, Jul. 2005, pp. 777-786, vol. 24, No. 3, ACM Press, New York, NY, USA.

Lefebvre, S., and H. Hoppe, Appearance-space texture synthesis, ACM Trans. on Graphics, Jul. 2006, pp. 541-548, vol. 25, No. 3, ACM Press, New York, NY, USA.

Leung, T., and J. Malik, Representing and recognizing the visual appearance of materials using 3D textons, Int'l J. of Comp. Vision, Jun. 2001, pp. 29-44, vol. 43, No. 1, Springer, Netherlands.

Liang, L., C. Liu, Y. Xu, B. Guo, and H.-Y. Shum, Real-time texture synthesis by patch-based sampling, ACM Trans. on Graphics, Jul. 2001, pp. 127-150, vol. 20, No. 3, ACM Press, New York, NY, USA.

Liu, Y., W.-C. Lin, and J. H. Hays, Near-regular texture analysis and manipulation, ACM Trans. on Graphics, Aug. 2004, pp. 368-376, vol. 23, No. 3, ACM Press, New York, NY, USA.

Lu, J., A. S. Georghiades, A. Glaser, H. Wu, L.-Y. Wei, B. Guo, J. Dorsey, and H. Rushmeier, Context-aware textures, ACM Trans. on Graphics, Jan. 2007, pp. 1-22, vol. 26, No. 1, ACM Press, New York, NY, USA.

Matusik, W., M. Zwicker, F. Durand, Texture design using a simplicial complex of morphable textures, ACM Trans. on Graphics, Jul. 2005, pp. 787-794, vol. 24, No. 3, ACM Press, New York, NY, USA.

Mertens, T., J. Kautz, J. Chen, P. Bekaert, F. Durand, Texture transfer using geometry correlation, Proc. of Eurographics Symposium on Rendering, Jun. 2006, pp. 273-284, The Eurographics Association.

Paris, S., H. M. Briceño, F. X. Sillion, Capture of hair geometry from multiple images, ACM Transactions on Graphics, Aug. 2004, pp. 712-719, vol. 23, No. 3, ACM Press, New York, NY, USA.

Perona, P. and J. Malik, Detecting and localizing edges composed of steps, peaks and roofs, 3rd Int. Conf. on Comp. Vision, Dec. 1990, pp. 52-57, IEEE Computer Society, Washington, DC, USA.

Portilla, J. and E. P. Simoncelli, A parametric texture model based on joint statistics of complex wavelet coefficients, Int'l J. of Comp. Vision, Oct. 2000, pp. 49-71, vol. 40, No. 1, Kluwer Academic Publishers, Netherlands.

Qin, X, and Y.-H. Yang, Basic gray level aura matrices: Theory and its application to texture synthesis, Proceedings of the Tenth IEEE Int'l Conf. on Comp. Vision, Oct. 2005, pp. 128-135, vol. 1, IEEE Computer Society, Washington, DC, USA.

Ritter, L., W. Li, B. Curless, M. Agrawala, and D. Salesin, Painting with texture, 17th Eurographics Symposium on Rendering, Jun. 2006, pp. 371-376, The Eurographics Association.

Soatto, S., G. Doretto, and Y. N. Wu, Dynamic textures, Proc. of IEEE Int'l Conf. on Comp. Vision, Jul. 2001, pp. 439-446, IEEE Computer Society, Washington, DC, USA.

Tong, X., J. Zhang, L. Liu, X. Wang, B. Guo, and H.-Y. Shum, Synthesis of bidirectional texture functions on arbitrary surfaces, Proc. of the 29th Annual Conf. on Comp. Graphics and Interactive, Jul. 2002, pp. 665-672, ACM Press, New York, NY, USA.

Turk, G., Texture synthesis on surfaces, Proceedings of the 28th Annual Conf. on Comp. Graphics and Interactive Techniques, Aug. 2001, pp. 347-354, ACM Press, New York, NY, USA.

Wang, J., X. Tong, S. Lin, M. Pan, C. Wang, H. Bao, B. Guo and H.-Y. Shum, Appearance manifolds for modeling time-variant appearance of materials, ACM Transactions on Graphics, Jul. 2006, pp. 754-761, vol. 25, No. 3, ACM Press, New York, NY, USA.

Wei, L.-Y., and M. Levoy, Fast texture synthesis using tree-structured vector quantization, Proc. of the 27th Annual Conf. on Comp. Graphics and Interactive Techniques, Jul. 2000, pp. 479-488, ACM Press, New York, NY, USA.

Wei, L.-Y., and M. Levoy, Texture synthesis over arbitrary manifold surfaces, Proc. of the 28th Annual Conf. on Comp. Graphics and Interactive Techniques, Aug. 2001, pp. 355-360, ACM Press, New York, NY, USA.

Xu, Y.-Q., B. Guo, and H.-Y. Shum, Chaos mosaic: Fast and memory efficient texture synthesis, Technical Report MSR-TR-2000-32, Apr. 20, 2000, pp. 1-32, Microsoft Research, Microsoft Corporation.

Zhang, J., K. Zhou, L. Velho, B. Guo, and H.-Y. Shum, Synthesis of progressively-variant textures on arbitrary surfaces, ACM Transactions on Graphics, Aug. 2003, vol. 22, No. 3, pp. 295-302, ACM Press, New York, NY, USA.

Ziou, D., and S. Tabbone, Edge detection techniques—An overview, Int'l J. of Pattern Recogn. and Image Analysis, 1998, vol. 8, No. 4, pp. 537-559, MAIK Nauka/Interperiodica.

* cited by examiner

INVERSE TEXTURE SYNTHESIS

BACKGROUND

1. Technical Field

A "texture generator" provides techniques reducing texture sizes for use by a graphics processing unit (GPU), and in particular, various techniques for constructing small 2D texture compactions from large globally variant textures or images for use in efficient synthesis of inhomogeneous or globally variant textures on a GPU.

2. Related Art

Texturing or texture synthesis is an essential component for almost every graphics applications, especially computer-based gaming, including PC-type computers and the use of gaming consoles, such as, for example, the Xbox 360®. In general, such systems use one or more GPUs to synthesize images or to texture images or portions of images for display. One limitation generally affecting such systems is that GPU texture memory generally limits the size or number of texture samples used to construct the images or to texture portions of images. The result of this limitation is generally decreased realism or resolution of the synthesized or textured images.

Traditional example-based forward texture synthesis often relies on a small Markov Random Field (MRF) input sample (i.e., the "example" in example-based forward texture synthesis). Unfortunately, due to the limited input data of such samples, these techniques are often unable to reproduce the richness of natural phenomena, such as, for example, surface rust, drying paint, etc.

For example, traditional forward texture synthesis algorithms generally rely on the assumption that the input texture is homogeneous, i.e., local and stationary with respect to the MRF definition. However, not all textures are homogeneous, as natural patterns often exhibit global variations conditioned on environment factors such as iron rusting following the moisture level over a statue. Such textures that are local but not stationary can be referred to as "globally varying" textures. The environmental factors that determine the global texture distribution of such globally varying textures is referred to as a "control map." Typical examples of control maps include context information, spatial-varying parameters, and a degree map. With the advance of data capturing technologies as well achievable synthesis effects, globally varying textures are becoming more and more important.

Applications based on conventional forward texture synthesis techniques include surface texturing, animation, image editing, time varying phenomena, etc. Such techniques generally use a small texture sample generated from an original input image or input texture to texture another image or model (including 2D and 3D models). The core algorithms of these techniques are generally classified as being either local or global, depending on the texture statistics or characteristics used. One limitation of local forward texture synthesis techniques is such techniques often fail to retain global features of the original input image or input texture used to create the texture sample. Similarly, global forward texture synthesis techniques often fail to retain local texture details of the original input image or input texture used to create the texture sample. In either case, the result is an output image or texture that may lack realism and may include visible artifacts such as discontinuities.

Despite their success, most existing forward synthesis algorithms have limited pattern variation and computation speed, as they have been primarily concerned with synthesizing stationary textures on a computer CPU. The speed issue has been addressed by parallel GPU texture synthesis which runs much faster than CPU-based algorithms. A further advantage of GPU synthesis is reduced storage; this is very important for real-time applications, since typical GPUs often have limited texture memory. Unfortunately, typical GPU-based texture synthesis algorithms do not support globally-variant texture synthesis.

The pattern variation issue has been partially addressed by recent advances in globally variant texture synthesis. For example, several conventional techniques either use stationary inputs and establish artificial correspondence for texture synthesis, or synthesize directly from captured patterns along with control factors. Although the use stationary inputs with artificial correspondence can often produce interesting morphing or transition patterns, such techniques often lack the realism provided when synthesizing directly from captured patterns along with control factors. However, one significant disadvantage of using captured globally variant textures is their large size, which tends to cause memory and speed problems for texture synthesis. This is of particular concern since as texture size increases, GPU performance (in terms of parameters such as rendering speed and frame rate) tends to decrease.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "texture generator," as described herein, provides various techniques for using "inverse texture synthesis" techniques to construct small "2D texture compactions" from large globally variant textures or images (referred to herein simply as an "input texture"). The inverse texture synthesis runs in the opposite direction to traditional forward synthesis techniques. Further, the texture generator provides an optimization framework for inverse texture synthesis which ensures that each region of the input texture is properly encoded to provide an optimal compaction of the original input texture data. In other words, the inverse texture synthesis techniques described herein preserve both local and global characteristics of the original input texture used to construct the 2D texture compactions. In addition, in various embodiments, the texture generator also optionally computes orientation fields for anisotropic textures containing both low- and high-frequency regions.

Once computed, the texture compactions can then be provided to a graphics processing unit (GPU) or other specialized microprocessor, including one or more cores of a multi-core CPU or GPU that is dedicated to graphics processing tasks. The texture compaction is then used to reconstruct the original texture or image, or to re-synthesize new textures or images under user-supplied constraints using various forward synthesis techniques. As such, the texture generator described herein addresses both quality and synthesis speed issues when used with an accompanying GPU forward synthesis algorithm that is applicable to globally variant textures. For example, in various embodiments, the texture generator uses the texture compaction to provide real-time synthesis of globally variant textures on a GPU, where texture memory is generally too small for large textures.

More specifically, the inverse texture synthesis described herein generally provides an "optimization framework" coupled with an efficient solver for inverse texture synthesis. Traditionally, forward texture synthesis techniques use various optimization methods that often cast a neighborhood search process as optimizing an energy function for constructing a small output texture from a large input texture. In contrast, the texture generator described herein employs various optimization techniques to ensure that each neighborhood of the input texture has a presence in the output texture compaction. This optimization is achieved by minimizing an "inverse energy function" that measures a similarity between each input neighborhood of the input texture and its best match from the output texture compaction. Note that each "neighborhood" in the input texture or the texture compaction represents the immediately neighboring pixels around each particular pixel in the input texture or the texture compaction.

In various embodiments, the resulting texture compaction encodes both texture details and a control map corresponding to the original input texture. In other words, the inverse texture synthesis provided by the texture generator preserves not only the original input texture but also an auxiliary control map that determines the global texture distribution. The resulting small texture compaction can be used to reconstruct the original texture from its original control map or to re-synthesize new textures under a user-supplied control map, or using the orientation field computed during inverse texture synthesis.

Further, due to the reduced size of the texture compaction, the texture generator enables faster synthesis than from the original input texture. Note that unlike homogeneous textures, when synthesizing a globally varying texture, the user typically supplies or adjusts a control map to control the synthesis effects. More importantly, the small compaction provided by the texture generator allows real-time synthesis of globally varying textures on a GPU, where the texture memory is usually too small for large textures. In other words, the reduced size of the texture compaction is particularly beneficial for GPU applications where texture memory is a premium.

Furthermore, in various embodiments, the texture generator allows interactive user painting of globally varying textures onto existing images or models (including 2D and 3D models) by combining the generality of example-based texture synthesis with the controllability and flexibility of WYSIWYG-style user painting. For example, to increase an amount of rust along certain regions of a model or image, a user can mouse over, or otherwise designate particular portions of the model or image to indicate that the control map should apply increased levels of rust to the selected areas. The rust is then applied to the model or image via forward synthesis techniques using the texture compaction (likely computed from a large globally-variant input texture representing rust) in combination with the control map (that was adjusted by user painting of the model or image) to produce an output image or texture.

Additional applications of the texture generator include faster transmission of globally varying textures enabled by the small size of the output texture compaction, and better texture thumbnails for preview and search since the texture compactions are usually more accurate than traditional spatially-cropped or down-sampled thumbnails. Finally, another advantageous feature of the texture generator is that the resulting texture compactions provide plain 2D images or textures that can be directly utilized by any texture synthesis algorithm.

In view of the above summary, it is clear that the texture generator described herein provides various unique techniques for constructing and using texture compactions for use in texture synthesis applications. In addition to the just described benefits, other advantages of the texture generator will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
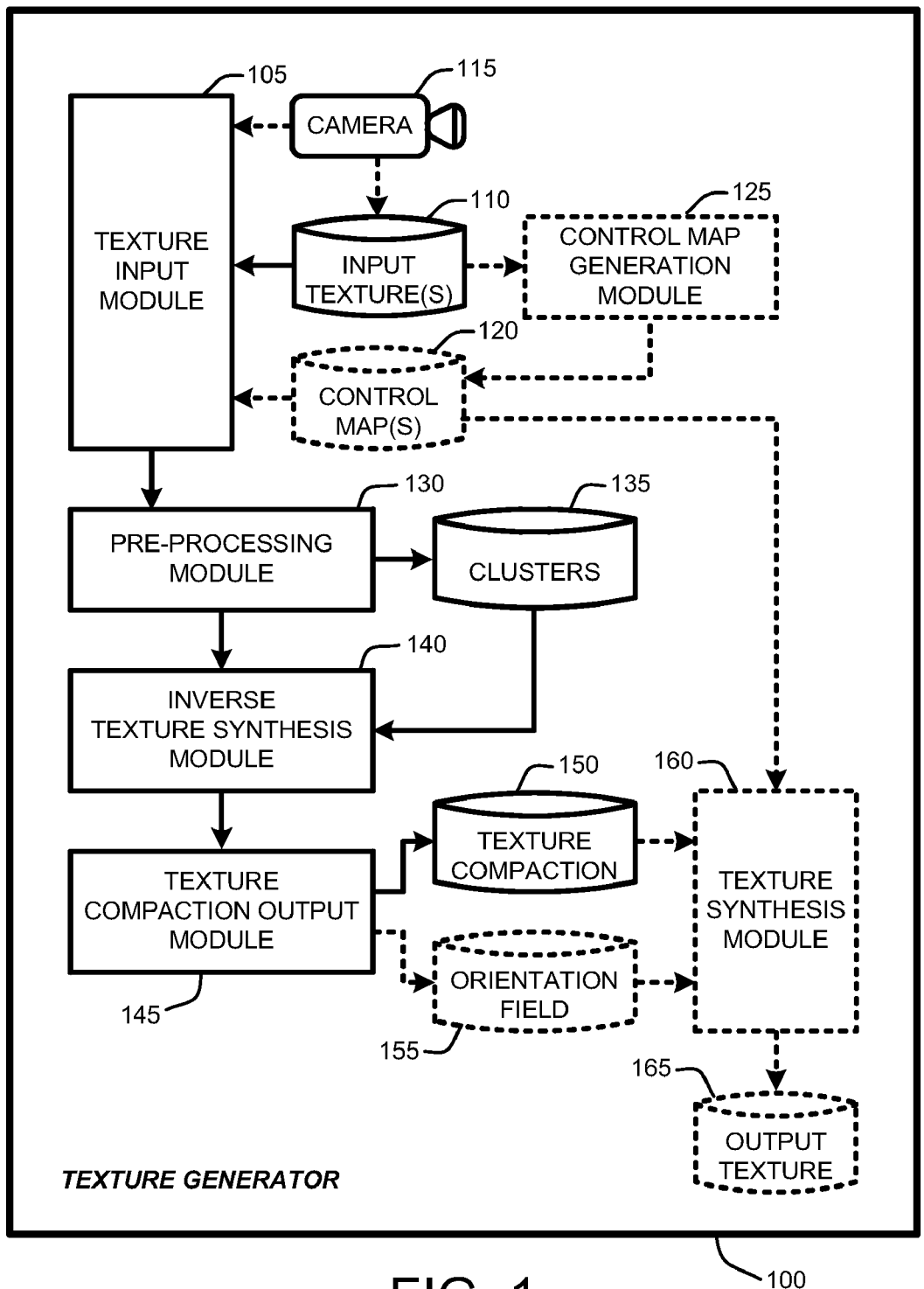
FIG. 1 provides an exemplary architectural flow diagram that illustrates program modules for implementing various embodiments of a "texture generator," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "texture generator" uses an inverse texture synthesis solution that runs in the opposite direction to traditional forward synthesis techniques to construct small 2D "texture compactions." These texture compactions are then stored and made available for use by a graphics processing unit (GPU) or other specialized microprocessor of a computer system for use in forward texture synthesis applications (i.e., generating new textures or images from the texture compaction). For computing the texture compactions, the texture generator provides an optimization framework for inverse texture synthesis which ensures that each region of an original image or texture is properly encoded in the output texture compaction. In other words, the small 2D texture compactions generally summarize an original globally variant texture or image. In addition, in various embodiments, the texture generator also computes orientation fields for anisotropic textures containing both low- and high-frequency regions.

These orientation fields can then optionally be used for subsequent rendering or synthesis applications using the texture compaction.

More specifically, the inverse texture synthesis described herein generally provides an "optimization framework" coupled with an efficient solver for inverse texture synthesis. Traditionally, forward texture synthesis techniques use various optimization methods that often cast a neighborhood search process as optimizing an energy function for constructing an output texture. In contrast, the texture generator described herein employs various optimization techniques to ensure that each neighborhood of the input texture has a presence in the output texture compaction. This optimization is achieved by iteratively minimizing an "inverse energy function" that measures a similarity between each input neighborhood and its best match from the output texture compaction. Note that each "neighborhood" in the input texture or the texture compaction represents the immediately neighboring pixels around each particular pixel in the input texture or the texture compaction.

Due to this similarity measurement, optimizing with the inverse energy term can be time computationally expensive for large input textures. Further, since this similarity measurement is performed in the reverse direction with respect to traditional texture synthesis, existing acceleration techniques, such as tree-structure, clustering, k-coherence, or other acceleration techniques, are not directly applicable as they are designed for static images, whereas the texture compaction described herein changes dynamically along with the optimization process. Therefore, in one embodiment, the texture generator provides an optimization solver that first pre-processes neighborhoods of the input texture into a small number of clusters. The texture generator then utilizes the transitive property of neighborhood similarity to accelerate optimization of the output texture compaction by conducting measurements for the neighborhoods through their cluster centers in constant time.

In various embodiments, the texture generator uses the texture compactions to reconstruct the original texture or image, or to re-synthesize new textures or images under user-supplied constraints. In addition, it should be noted that the computed texture compactions provide plain 2D images or textures that can be directly utilized by any texture synthesis algorithm, conventional or otherwise. Further, in various embodiments, the texture generator uses the texture compaction to provide real-time synthesis of globally variant textures on a GPU, where texture memory is generally too small for large textures.

In addition, it should be noted that the texture compactions described herein are generally describes with respect to a single input texture. However, it should be clear that a sequence of texture compactions can computed from a sequence of input textures. For example, assume a video sequence of some number of image frames of water drying on a surface. As the water dries, the surface in each frame of the video will change over time (e.g., as mud dries, the color of the mud tends to change, and the surface of the mud tends to crack). Therefore, by computing a texture compaction for two or more frames of the video sequence, then applying those texture compactions to synthesize a new sequence of output textures (or images), the new sequence of output textures will have an appearance of drying surface water similar to the sequence of the original video. Note that the primary difference here is that rather than use a single texture compaction to synthesize a single output texture, a series of related texture compactions are used to synthesize a series of related output textures. Therefore, this concept will not be described in further detail herein since it merely involves applying the techniques for a single texture compaction some number of times to create multiple output textures.

1.1 System Overview:

As noted above, the texture generator provides various techniques for using inverse texture synthesis to construct optimized 2D texture compactions for use in texture synthesis applications. The processes summarized above are illustrated by the general system diagram of FIG. 1. In particular, the system diagram of FIG. 1 illustrates the interrelationships between program modules for implementing various embodiments of the texture generator, as described herein. Furthermore, while the system diagram of FIG. 1 illustrates a high-level view of various embodiments of the texture generator, FIG. 1 is not intended to provide an exhaustive or complete illustration of every possible embodiment of the texture generator as described throughout this document.

In addition, it should be noted that any boxes and interconnections between boxes that are represented by broken or dashed lines in FIG. 1 represent alternate embodiments of the texture generator described herein, and that any or all of these alternate embodiments, as described below, may be used in combination with other alternate embodiments that are described throughout this document.

In general, as illustrated by FIG. 1, the processes enabled by the texture generator 100 begin operation by using a texture input module 105 to receive an input texture 110. Such input textures 110 can be either pre-recorded or pre-computed using conventional techniques, and stored on some type of computer-readable medium, or can be captured live from some signal input source (such as a digital still or video camera 115 in the case where actual images are used as input textures). In addition, in various embodiments, an optional control map 120 associated with the input texture 110 is also provided to the texture input module 105. In various embodiments, this control map 120 is either pre-defined, or is computed from the input texture 110 using a control map generation module 125.

Regardless of the source of the input texture 110, once received by the texture generator 100, the texture input module 105 passes the input texture to a pre-processing module 130. The pre-processing module 130 then evaluates the input texture 110 and performs an initial clustering of all pixels of the input texture. A center of each cluster 135 is then used to construct a set of cluster centers, as described in further detail in Section 2.2. In a tested embodiment, a median pixel in each cluster 135 was selected as the cluster center. However, other methods of selecting cluster centers, including averaging, least-square techniques, etc., can also be used, if desired.

In addition to defining clusters 135 and cluster centers, the pre-processing module 130 also defines initial parameters for initializing inverse texture synthesis computations. In general, as described in further detail in Section 2.2, these initial parameters include the aforementioned clusters 135 and cluster centers, selecting random initial values from the clusters for the texture compaction and random initial values from the input texture 110 for spatial neighborhoods around each pixel of the texture compaction, and optionally initializing an orientation field corresponding to the input texture.

The pre-processing module 130 then passes the clusters 135 and initial parameters to an inverse texture synthesis module 140 that uses a modified energy-based expectation-maximization (EM) process to iteratively derive an optimum texture compaction, and optional orientation field. Once the inverse texture synthesis module 140 converges on a solution, or once some maximum number of iterations have been performed, the results of the inverse texture synthesis are passed to a texture compaction module 145. The texture compaction module 145 then stores the texture compaction 150 and optionally the orientation field 155 (if computed) for later use.

In particular, once the texture compaction 150 has been computed, it can be provided to a texture synthesis module 160 for use in synthesizing an output texture 165. Note that either or both the control map 120 and the orientation field 155 may also be provided to the texture synthesis module 160, if desired. As discussed in further detail below, the output texture 165 generally represents a texture that is synthesized in any desired shape or size (including texturing of 2D and 3D models) using any of a number of texture synthesis techniques for generating textures from a texture sample (which in this case is the texture compaction 150).

2.0 Operational Details of the Texture Generator:

The above-described program modules are employed for implementing various embodiments of the texture generator. As summarized above, the texture generator provides various techniques for using inverse texture synthesis to construct optimized 2D texture compactions for use in texture synthesis. The following sections provide a detailed discussion of the operation of various embodiments of the texture generator, and of exemplary methods for implementing the program modules described in Section 1 with respect to FIG. 1. In particular, the following sections examples and operational details of various embodiments of the texture generator, including: an operational overview of the texture generator; various techniques for solving the inverse texture synthesis problem; control maps; compaction size considerations; and real-time GPU synthesis using the texture compaction.

2.1 Operational Overview:

The texture generator addresses the inverse texture synthesis process as an optimization problem. Specifically, given an original input texture, X, the texture generator calculates a small texture compaction, Z, with either automatic or user-specified size, relative to an orientation field, W, by minimizing the energy function, $\Phi$, illustrated in Equation (1):

$$\Phi(x; z; w) = \frac{1}{|X^\dagger|} \sum_{p \in X^\dagger} |x_p(w_p) - z_p|^2 + \frac{\alpha}{|X^\dagger|} \sum_{q \in X^\dagger} |x_q(w_q) - z_q|^2 \quad \text{Equation (1)}$$

where the variables of Equation (1) are defined as follows:
- z and x represent sample values (i.e., pixels of the texture or image) for the texture compaction, Z, and the input texture, X, respectively;
- w is the orientation field for X;
- p and q are sample identifiers (e.g., pixels locations) that run through subsets of $X^\dagger$ of X and $Z^\dagger$ of Z, respectively;
- $x_p$ and $z_q$ indicate the spatial neighborhoods around p and q, respectively;
- $w_p$ and $w_q$ represent local orientations at p and q, respectively, from which $x_p$ and $x_q$ are sampled from;
- $z_p$ and $x_q$ are the most similar spatial neighborhoods in Z and X, respectively, with respect to $x_p$ and $z_q$; and
- $\alpha$ is a user tunable weighting factor.

Note that in various tested embodiments of the texture generator, it was observed that values of $\alpha$ on the order of about $\alpha=0.01$, worked well for most textures. However, in various embodiments, the value of $\alpha$ is user adjustable, and optimum values for particular applications can be determined experimentally, if desired.

Figure 2:
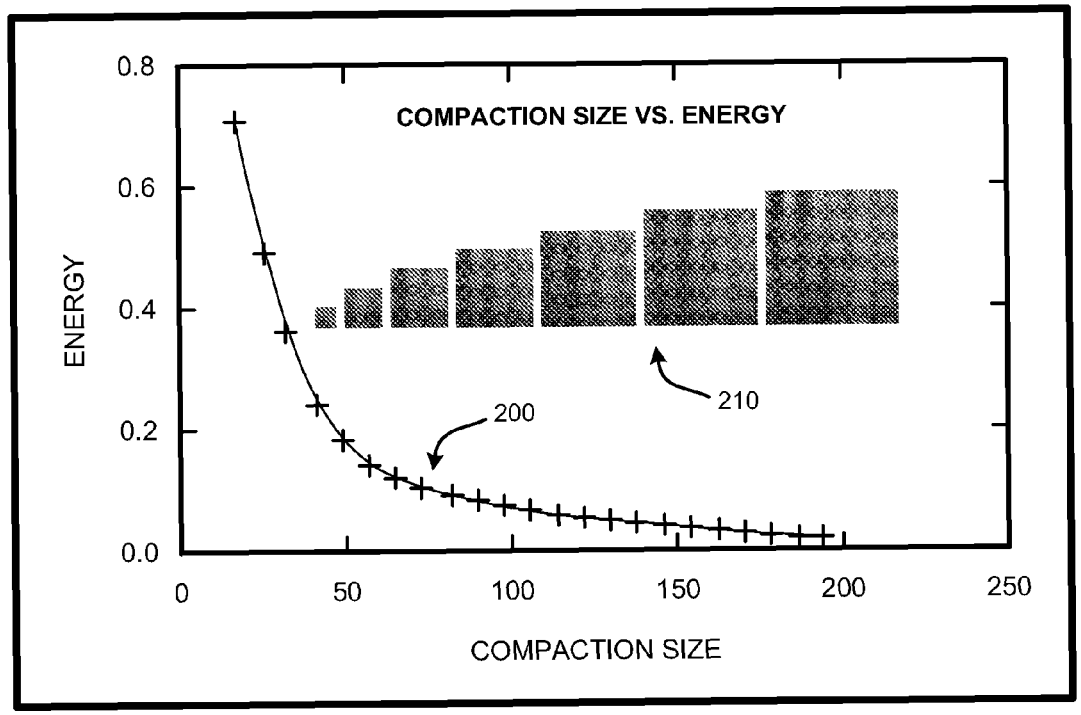
FIG. 2 illustrates a graph of energy levels as a function of texture compaction size, as described herein.

The energy function value $\Phi$ varies depending on the size of the texture compaction. In particular, as the compaction size becomes larger, there is a lower error level in minimizing the energy function, and thus a lower energy value, $\Phi$. An example of this concept is illustrated by FIG. 2. In particular, FIG. 2 illustrates a graph showing decreasing energy values 200 as the texture compaction size 210 increases. As noted above, in various embodiments, the size of the texture compaction is either user adjustable or automatically determined as described in further detail in Section 2.2.

As can be seen from Equation (1) the energy function $\Phi$ consists of two terms, $$\frac{1}{|X^\dagger|} \sum_{p \in X^\dagger} |x_p(w_p) - z_p|^2 \text{ and } \frac{\alpha}{|X^\dagger|} \sum_{q \in X^\dagger} |x_q(w_q) - z_q|^2.$$

Although having similar forms, each of these terms serves a completely different purpose. In particular, the first term, $$\frac{1}{|X^\dagger|} \sum_{p \in X^\dagger} |x_p(w_p) - z_p|^2,$$

measures a local similarity for a set of samples in the original input texture X with respect to the output texture compaction Z. By calculating an output texture compaction Z that minimizes this energy term, the texture generator attempts to ensure that for every input neighborhood $x_p$, a corresponding compaction neighborhood $z_p$ can be found that is similar to $x_p$. This first term, $$\frac{1}{|X^\dagger|} \sum_{p \in X^\dagger} |x_p(w_p) - z_p|^2,$$

is referred to as an "inverse term" due to its inverse synthesis nature. Without this inverse term, the resulting compaction might miss important features from the original input texture X.

In contrast, the second term, $$\frac{\alpha}{|X^\dagger|} \sum_{q \in X^\dagger} |x_q(w_q) - z_q|^2,$$

measures a local similarity for a set of samples in the output texture compaction Z with respect to the original input texture X using a forward synthesis process. The reason for incorporating this forward synthesis term is that a texture compaction Z computed from the inverse term alone may contain problems for re-synthesis. For example, it is possible that all of the original sample neighborhoods $\{x_p\}$ map to some corner of Z, causing garbage in other regions. Further, $\{x_p\}$ may also map to disjoint regions of Z causing discontinuities across region boundaries. While neither of these problems can be detected using the inverse term alone, the combination of the inverse term with the forward term of Equation (1) allows these problems to be eliminated. In particular, in various embodiments, the energy minimization process described in greater detail in Section 2.2 inherently prunes bad candidate samples that would otherwise result in some of the problems noted above.

If the original input texture X is defined over a 3D surface rather than a 2D grid, the texture generator samples $x_p$ via conventional local flattening techniques. As a result, the texture generator does not require global or even large scale parameterization for surface textures, and can therefore produce a 2D compaction from a 3D surface with little distortion.

In various embodiments, for an anisotropic texture with non-uniform orientation (such as heavy rust along one portion of an object in an image, with variable levels of rust on other portions of the object), the texture generator also automatically computes the orientation field w from the input texture as part of the optimization process. It has been observed that a w that results in lower energy values usually yields compaction with a higher quality/size ratio. In contrast, for isotropic input textures, w is left as a constant; i.e. a regular grid for 2D textures and a smooth orientation field for surface textures.

Once the texture generator has computed the texture compaction, it can be provided directly to any conventional texture synthesis algorithm for re-synthesis. For homogeneous patterns, all that is needed is the texture information of the texture compaction. However, for globally variant textures, a control map is also required for user-controllable synthesis. Control maps, such as, for example, user specifications, frame-coherence constraints, context information, spatially-varying parameters, degree maps, etc, are known to those skilled in the art, and will not be described in detail herein. The precise semantics and usage of the control map depend on the specific control map algorithm. However, in various embodiments, the texture generator is designed to handles all such control map information, as each pixel is treated as a generic vector that may contain color, control, or any other auxiliary information.

2.2 Solving the Inverse Texture Synthesis Problem:

As noted above, the texture generator provides various techniques for solving the inverse texture synthesis problem of Equation 1. For example, Section 2.2.1 describes one embodiment based on straightforward expectation-maximization (EM) optimization. This EM-based solver is capable of achieving good quality for the forward synthesis term of Equation (1). However, there are some limitations in both speed and quality with respect to the inverse synthesis term of Equation (1). Therefore, in another embodiment, described below in Section 2.2.2, the texture generator provides an improved solver that addresses both speed and quality for both the inverse and forward synthesis terms of Equation (1). Note that both solver techniques described in the following sections are multi-resolution in form and compute the output compaction from lower to higher resolutions. For reference, pseudo-code illustrating the various embodiments of the solver techniques are provided below in Table 1. Note that as discussed herein, solving for the orientation field w is optional, and depends upon whether the original input texture X is anisotropic or isotropic in nature.

TABLE 1

| Pseudo-Code for Inverse Texture Synthesis |
|---|
| 1. $z_p^0 \leftarrow$ random neighborhood in Z $\forall$ p $\in$ X$^\dagger$ (In other words, pixels of the texture compaction, $z_p^0$, are assigned initial values selected from a random neighborhood of the output texture compaction Z for all pixels p belonging to a subset X$^\dagger$ of the input texture). |
| 2. $x_{q_0}^0 \leftarrow$ random neighborhood in X $\forall$ q $\in$ Z$^\dagger$ (In other words, $x_{q_0}$ is assigned an initial value from a random neighborhood of the input texture X for all pixels q belonging to a subset Z$^\dagger$ of the output texture compaction). |

TABLE 1-continued

| Pseudo-Code for Inverse Texture Synthesis |
|---|
| 3. $w^0 \leftarrow$ orientation field initialized using conventional techniques and/or manual selection. |
| 4. for iteration m = 0:M // for w |
|   a. foreach resolution l = 0:L |
|     i. if l < L w $\leftarrow$ downsample from w at L |
|     ii. if l > 0 z $\leftarrow$ upsample from z at L − 1 |
|     iii. for iteration n = 0:N do |
|       1. $z^{n+1} \leftarrow \arg\min_z \Phi(x; z; w)$ // z E-step |
|       2. foreach |
|         a. $z_p^{n+1} \leftarrow \arg\min_{z_p} \|x_p(w_p) - z_p\|^2$ // inverse M-step |
|       3. foreach |
|         a. $x_q^{n+1} \leftarrow \arg\min_{x_q} \|x_p(w_p) - z_p\|^2$ // forward M-step |
|       4. if |
|         a. $z \leftarrow z^{n+1}$ |
|         b. if l == L // highest resolution |
|           i. $w^{n+1} \leftarrow \arg\min_w \Phi(x; z; w)$ // w E-step |
|           ii. if $w^{n+1} == w^n$ |
|             1. $w \leftarrow w^{n+1}$ |
|             2. return |
|           iii. end if |
|         c. end if |
|       5. end if |
|     iv. end for |
|   b. end foreach |
| 5. end for |

2.2.1 Basic EM-Based Solver:

The core part of the solver includes E-steps and M-steps of an expectation-maximization process as summarized by the pseudo-code of Table 1. In general, as illustrated by Table 1, at each E-step, the texture generator solves for z and w to minimize the energy function $\Phi$ (covering both energy terms simultaneously). At each M-step, the texture generator searches each neighborhood of $x_p$ and $z_q$ on X and Z, respectively, for the most similar neighborhoods in $z_p$ and $x_q$ on the Z and X, respectively. The output of each step feeds as input to the next, and the texture generator iterates this process several times until convergence or until reaching a pre-determined number of iterations.

Note that as illustrated by the pseudo-code of Table 1, in step 4(a)(iii), the process continues for N iterations. However, as noted above, this process can also be terminated at any time that a minimum amount of change from one step to the next has been observed. In other words, in various embodiments, the process terminates either at some fixed number of iterations or when convergence of the output texture compaction is reached within some acceptably small error range. It should also be noted that computation of the orientation field w illustrated in step 4(b) of the pseudo-code shown in Table 1 is optional, and that there is no need to compute the orientation field for isotropic input textures that are relatively uniform across the input texture X.

Conventional EM solvers typically use tree search techniques for the M-step and least square based techniques for the z E-step. Unfortunately, both of these conventional techniques cause problems for inverse synthesis term of Equation (1). For example, for the M-steps, it has been observed that tree search techniques are too slow for large input textures. In addition, tree search techniques (or any other similar pre-processed acceleration data structures) are not applicable to the inverse M-step since the output texture compaction Z is constantly changing until convergence. Further, for the z E-step, the least square solver could potentially cause excessive blur. In addition, it should be noted that conventional EM-based methods have no correspondence for the w E-step which involves finding optimal local orientations. Therefore, another embodiment of the solver that addresses such issues is described below in Section 2.2.2.

2.2.2 Improved Solver:

In general, the improved solver described in the following paragraphs provides an improvement over the EM-based solver described in Section 2.2.1 in terms of both speed and overall quality of the texture compaction (in terms of images or textures synthesized from the resulting texture compaction. This improved solver technique ensures that no blur is introduced in the z E-step, and consumes constant time per pixel search for both the forward and inverse M-steps.

2.2.2.1 Pre-Processing Stage (Steps 1-3 of Pseudo-Code in Table 1):

During the pre-processing stage, the texture generator first computes a k-coherence similarity-set s(p) for each input pixel p, where s(p) contains a list of other pixels with neighborhoods similar to p. The size of the similarity-set, K, is a user-controllable parameter that determines the overall speed and quality. The similarity set, s(p), will then be utilized for both the z E-step and forward M-step as detailed below. The texture generator also performs an initial clustering of the input neighborhoods using conventional Tree Structured Vector Quantization (TSVQ) techniques and collects the cluster centers into a set $X_c$. For each input pixel p, the texture generator finds a subset c(p) of set $X_c$ with the most similar neighborhood to p. Note that both $X_c$ and c(p) are utilized for the inverse M-step as detailed below.

In addition, the texture generator also initializes w using conventional techniques for determining orientation fields and/or limited manual specifications of the orientation field. Even though these methods might not yield good orientations at every input pixel location, they provide better initial conditions to help the subsequent optimizations performed by the texture generator.

Note that the pre-processing steps described above correspond to steps 1 through 3 of the pseudo-code provided in Table 1.

2.2.2.2 z E-Step (Step 4(a)(iii)(1) of Pseudo-Code in Table 1):

To address potential problems with blur, the texture generator adapts a novel discrete solver. In particular, instead of using a least square approach as with conventional E-Steps, the texture generator only allows direct copy of sample values from the input texture X to the texture compaction Z. During the copy operation, the texture generator not only copies the pixel color plus control information, but also the source location of each copied pixel. Specifically, to compute $z^{n+1}$ in the z E-step, each one of its values z(q) at pixel q of the texture compaction is determined independently from each other. For each q, the texture generator first constructs its k-coherence candidate set k(q) by taking the union of similarity sets $\{s(q_i)\}$ from the spatial neighbors $\{q_i\}$ of q (plus proper shifting using conventional shifting techniques). Then, z(q) for the next iteration is chosen from k(q) as the one that most reduces the energy function. Since now each z(q) is copied directly from some input pixel, the texture generator avoids the blur issue seen in conventional least square-based techniques.

2.2.2.3 Forward M-Step (Step 4(a)(iii)(3) of Pseudo-Code in Table 1):

Since pixels are directly copied in the z E-step, as described above, the texture generator can retain the input location information of the pixel to conduct a k-coherence search in the forward M-step. Specifically, for each output neighborhood $z_q$ at pixel q, the texture generator determines a best match from a neighborhood $x_q$ from the input texture as the one in k(q) (constructed in the same method as in z E-step) that is most similar to $z_q$. Since this is a constant time operation, it is much faster than conventional tree search techniques. Unfortunately, this k-coherence acceleration cannot be applied to the inverse M-step, as the texture compaction Z is constantly changing. This issue is addressed in the following paragraphs.

2.2.2.4 Inverse M-Step (Step 4(a)(iii)(2) of Pseudo-Code in Table 1):

At the inverse M-step, the texture generator determines, for each input neighborhood $x_p$, the best match $z_p$ at the texture compaction Z. There are a number of ways in which this determination can be made. For example, in one embodiment, the texture generator performs an exhaustive search through the texture compaction Z for each $x_p$. However, this technique can be computationally expensive if Z is sufficiently large. Further, since Z is constantly changing, this search cannot be accelerated via traditional methods that require pre-processing (such as kd-tree or TSVQ based techniques). Furthermore, even if Z is small enough to allow an exhaustive search, repeating this process for all input neighborhoods is still computationally expensive due to the large input size.

Therefore, in another embodiment, the texture generator provides a new acceleration technique that can address both the issues of a constantly changing output and a large input. In general, to implement this new acceleration technique, instead of exhaustively searching through Z for each $x_p$ in X, as described above, the texture generator performs a direct search for only a subset $X_c$ of X. For each p not in $X_c$, instead of a direct search, the texture generator find its best match in Z indirectly through a set of intermediaries in $X_c$. In this scheme, the texture generator achieves a significant search acceleration by performing direct search for only a subset $X_c$ of X, and guarantees quality via the transitive property of neighborhood similarity.

In particular, with respect to $X_c$ construction, note that intuitively, $X_c$ should contain candidates that best represent the input neighborhoods. The texture generator achieves this by clustering the input neighborhoods via TSVQ, and construct $X_c$ as the set of cluster centers. However, in contrast to conventional TSVQ, the texture generator defines the cluster centers via the median, and not average so that actual pixels are selected rather than "averaged pixels" that might result in a texture compaction that causes blurring or other artifacts in an output texture. While this difference is minor, it also ensures good search results through Z. During run time, at the beginning of each inverse M-step, the texture generator performs a full search for each member of $X_c$.

Further, with respect to the indirect search noted above, for each p not in $X_c$, the texture generator first find a subset c(p) of $X_c$ with the most similar neighborhoods to p. This is done only once as a pre-process. During run-time, after a full search is performed for $X_c$, the texture generator only searches the possible output locations of c(p) to find the best match for $x_p$. Note that this is a constant time operation since c(p) has a fixed size.

Further, in additional embodiments, the texture generator trades between quality and speed of the indirect search by tuning its parameters, including the sizes of $X_c$ and c(p). Note that when $X_c \cong X$, the indirect search described above would effectively reduce to a full search. In tested embodiments of the texture generator, the size of $X_c$ was chosen to be roughly equivalent to the size of the texture compaction Z, with the rational being that Z should contain a good representation of input cluster centers. In tested embodiments, this heuristic has been observed to be effective, along with setting c(p) to be on the order of about 1. To further facilitate varying sizes of Z, the texture generator uses TSVQ to build a tree and constructs $X_c$ via conventional tree cut techniques to achieve an optimal rate/distortion ratio. In this scenario, the TVSQ tree is built only once for each input texture, X, and can be repeatedly utilized for varying the size of the texture compaction, Z.

2.2.2.5 w E-Step (Step 4(a)(iii)(4)(b)(i) of Pseudo-Code in Table 1):

In the w E-Step, the texture generator refines the initial orientation field as part of the optimization process (assuming an anisotropic input texture X). As illustrated by the pseudo-code shown in Table 1, the solver updates the orientation field w only at the highest pyramid resolution after z stabilizes. There are two reasons for this. First, unlike z which starts with a random initialization during the pre-processing step, w starts with a reasonably good initial condition as described above with respect to the pre-processing step. Consequently, the texture generator only needs to refine w instead of computing it from scratch. Second, it has been observed that updating w only at the highest resolution after z stabilizes yields the best results.

This refining of w can be performed using several different techniques. For example, in one embodiment, a simple approach is to repeatedly rotate each $w_p$ and resample $x_p(w_p)$ until arg $\min_w \Phi(x; z; w)$ is found. However, this simple approach has been observed to be not only computationally expensive but also prone to produce discontinuities and artifacts. Therefore, in another embodiment, the texture generator computes $w_p$ iteratively and within each iteration, the texture generator only considers orientations within an interval $[\bar{\theta}-\Delta\theta, \bar{\theta}+\Delta\theta]$, where $\bar{\theta}$ is initialized as the average of p's spatial neighbors and updated with the best orientation of $w_p$ computed at the end of iteration, and $\Delta\theta$ is initialized as a value such as 90 degrees, and reduced at the end of each iteration. In a tested embodiment, the reduction of the end of each iteration successively halved the value of $\Delta\theta$ at the end of each iteration.

For example, in a tested embodiment, within each iteration the texture generator selected samples from a total of 36 uniformly spaced samples from $[\bar{\theta}-\Delta\theta, \bar{\theta}+\Delta\theta]$, and identified some small set of orientations (such as three, for example) yielding the lowest energy function values. Note that the choice of 36 samples was chosen only for convenience, and that there is no requirement to limit the texture generator to this number of samples. The texture generator then chooses the one that is closest to $\bar{\theta}$. Note that the orientation closest to $\bar{\theta}$ is chosen instead of simply choosing the orientation yielding the lowest energy function value to avoid causing disoriented orientation fields that might cause artifacts or discontinuities. In other words, selection of the closest orientation from the set of possible values introduces a "regularization term" into the computation that best approximates the orientation field of the original input texture. The texture generator performs these iterations for each pixel p. Further, in one embodiment, after w is updated for the entire input, the texture generator performs a filtering (such as, for example, a bilateral filtering, or other filtering, as desired) to provide a final smoothing.

Finally, since input neighborhoods are resampled according to w, after w is changed at the end of each w E-step, all of the acceleration data structures, such as $X_c$, c(p), and s(p) will be out of date. In one embodiment, these data structures are incrementally updated. However, it has been observed that a brute force optimization can be successfully used here without a significant increase in computational overhead.

Figure 3:
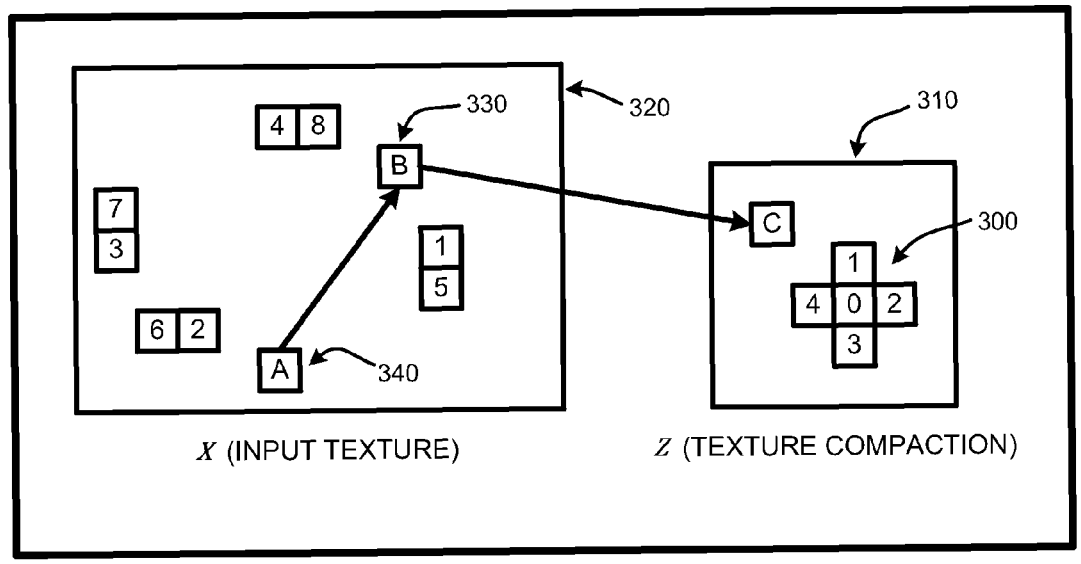
FIG. 3 provides a simplified graphical representation of steps performed for implementing an improved solver for performing inverse texture synthesis to generate a texture compaction from an input texture, as described herein.

2.2.2.6 Graphical Representation of the Improved Solver:

FIG. 3 provides a simplified graphical representation of the steps described above for implementing the improved solver. In particular, assume a simplified case with only four k-coherence neighbors 300 as exemplified by pixels {1, 2, 3, 4} around pixel 0 in the texture compaction 310. The sources of these four pixels are marked with the same numbers in the input texture 320. In the z E-step, the value of pixel 0 is chosen from pixels {5, 6, 7, 8} which are the neighbors of pixel 0's neighbors {1, 2, 3, 4} in the input texture 320. In the forward M-step, the best match for pixel 0 is also chosen from pixels {5, 6, 7, 8} in the input texture 320. Next, in the inverse M-step, B 330 is a cluster center, with A 340 being a member of that cluster. Therefore, the texture generator first finds the best match C 350 in the texture compaction 310 to B 330 in the input texture 320 through an exhaustive search. In addition, the best match for A 340 is determined through B 330.

2.3 Control Maps:

For globally varying textures, it has been observed that the texture generator works well when the original control map is reasonably correlated with the original texture pattern. If not, it may not be possible to synthesize a realistic version of the original input texture from the texture compaction. In general, without the use of a control map, as the size of the texture compaction increases, the texture compaction is more likely to be capable of producing a realistic version of the input texture. Further, with the use of a control map, the texture compaction can be significantly smaller than the input texture while still being capable of producing a realistic version of the input texture. In addition, as the resolution of the control map increases, the realism of the output texture, relative to the input texture, also tends to increase.

Figure 4:
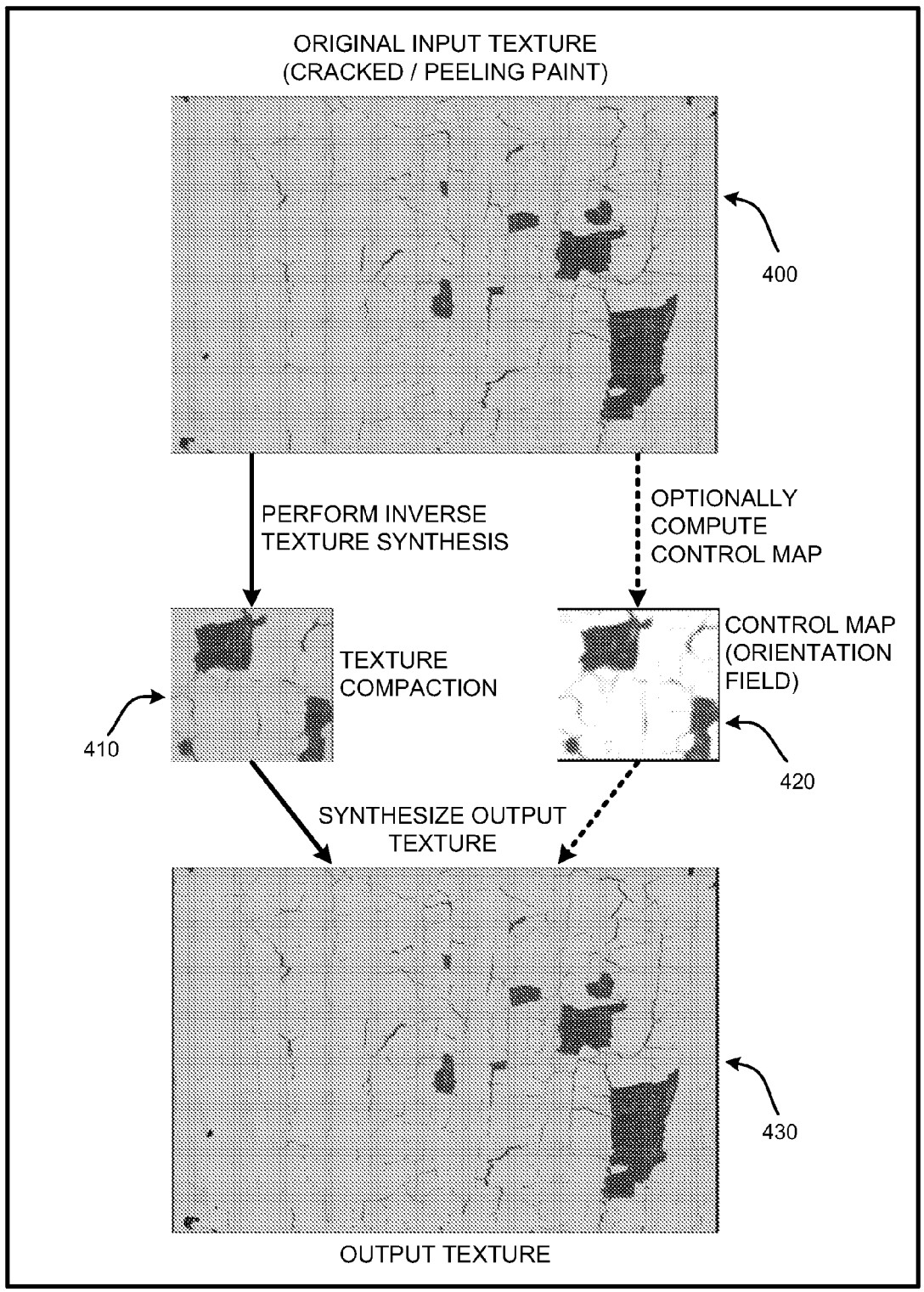
FIG. 4 provides a graphical representation of computing a texture compaction and a control map from an input texture, then synthesizing an output texture that very closely approximates the input texture from the texture compaction and the control map, as described herein.

In either case, one advantage of the texture compactions produced by the texture generator is that these texture compactions are of sufficient quality to allow realistic reconstruction of the original input texture, as shown in FIG. 4. In particular, as shown in FIG. 4, the texture generator receives the original input texture 400, which in this case is an image of cracked and peeling paint on a surface. The texture generator then performs inverse texture synthesis to generate a texture compaction 410, and optionally computes a control map 420. Given the texture compaction 410 and the optional control map 420, the texture generator then applies any desired texture synthesis technique to synthesize an output texture 430. In this case, as illustrated by FIG. 4, the synthesized output texture 430 is the same size as the input texture 400, and the control map 420 was used in synthesizing that output texture. Consequently, the output texture 430 is visibly a very close match to the original input texture 400.

In addition to reconstruction of original textures, the texture compactions created by the texture generator can also be used to re-synthesize novel textures in any desired shape or on 2D or 3D models, with or without the use of user-supplied controls or control maps. In other words, once the texture compaction is computed, that texture compaction can be used to synthesize textures of any desired shape or size, and can be used to texture 2D and 3D models.

Figure 5:
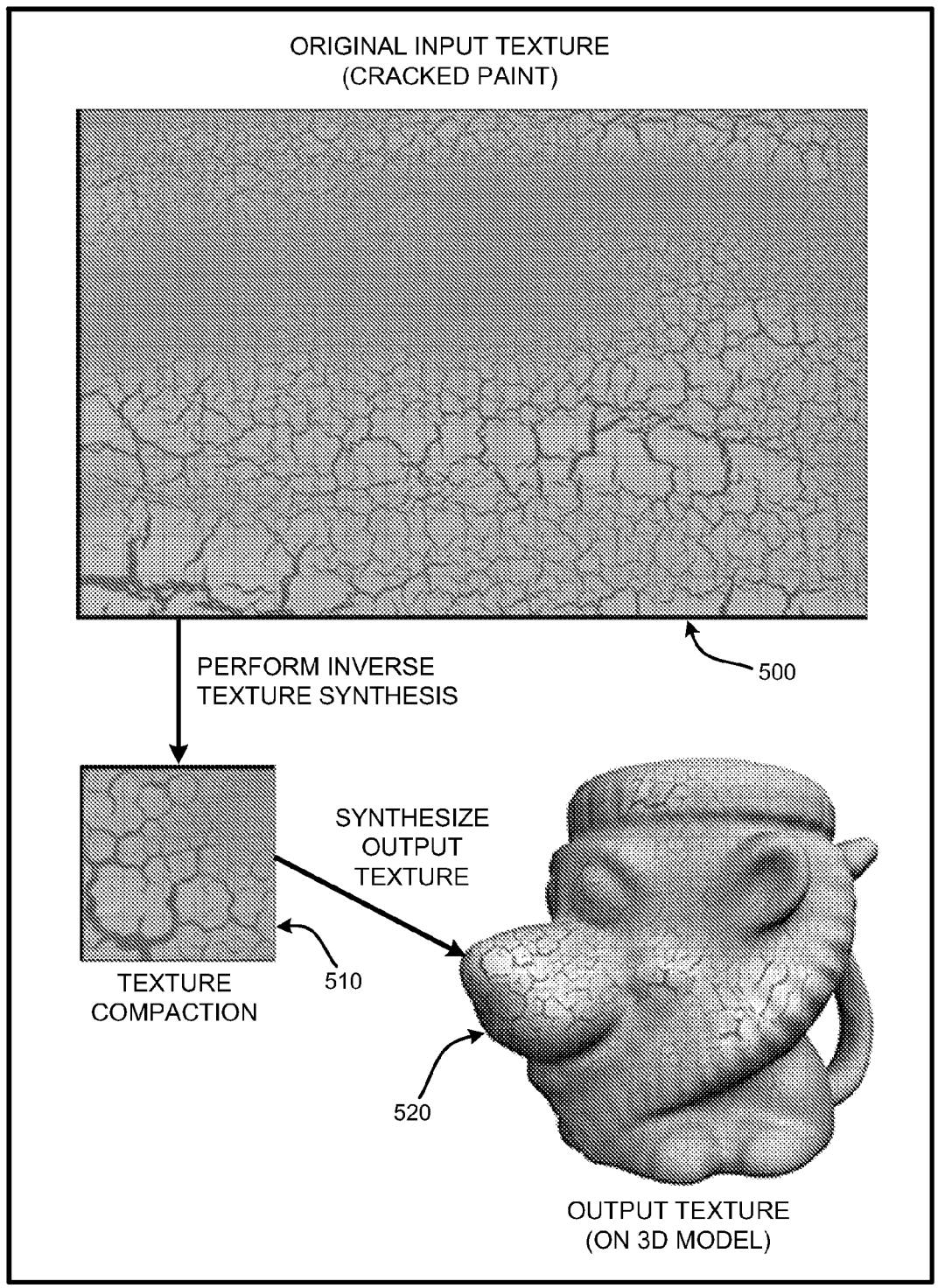
FIG. 5 provides a graphical representation of computing a texture compaction from an input texture, then synthesizing an output texture onto a 3D model from the texture compaction, as described herein.

For example, as illustrated by FIG. 5, an input texture 500, which is again an image of cracked paint, is provided to the texture generator which performs inverse texture synthesis to compute a texture compaction 510. This texture compaction 510 is applied to a conventional 3D model using any desired forward synthesis technique to generate an output texture 520. In this case, the 3D model is a mug in the shape of a lion's head. Consequently, the resulting output texture 520 is an image of a mug in the shape of a lion's head having an appearance of cracked paint on its surface in accordance with the texture compaction 510. Note that while the use of a control map was not illustrated in FIG. 5, a control map can be used, if desired, such the appearance of cracked paint on the surface of the mug would more closely match the texture of the image of cracked paint used as the original input texture 500.

Consequently, it should be clear that the texture generator does not require the use of a detailed control map for all textures. Further, control maps of different resolutions can also be used, if desired. Again, the use of control maps in forward texture synthesis is well known to those skilled in the art, and will not be described in detail herein.

2.4 Texture Compaction Size Considerations:

One of the key parameters of texture generator is the texture compaction size. As discussed above in Section 2.1 with respect to FIG. 2, the energy function value 200 is plotted with respect to compaction size 210 for a typical texture. Two observations can be made from an analysis of FIG. 2. First, the energy function value 200 decreases with the increase of compaction size 210, as expected. Second, a good choice of compaction size 210 lies somewhere around the knee point of the energy curve, corresponding to a compaction size of approximately 60 in this particular instance. The reason that a compaction size around this point is a good choice is that past this point, for even significantly larger compaction sizes, there is not a significant decrease in the energy function value. As such, realism of textures generated from the texture compaction does not improve significantly for larger compaction sizes. However, determining the final compaction size for every texture by plotting and evaluating an energy curve can be time consuming and computationally expensive.

Therefore, in another embodiment, the texture generator estimates an optimal compaction size M (in pixel$^2$) from the number of input clusters N (computed using the TSVQ techniques described in Section 2.2.2). One simple example of this estimation is illustrated below with respect to Equation (2), where:

$$M = \beta \times N \qquad \text{Equation (2)}$$

where $\beta$ is a fixed or user adjustable parameter that has been observed to provide good results when on the order of about 0.25. In a tested embodiment, the tree of the TSVQ technique was constructed using an error bound, $\epsilon$, as a function of maximum neighborhood distance, $d_{max}$, where the error bound $\epsilon = 0.05 \times d_{max}$. While there is no requirement to use an error bound of this magnitude, it has been observed to provide satisfactory results in various tested embodiments of the texture generator.

Finally, it should be noted that Equation (2) assumes a square texture compaction with dimensions of M×M pixels. However, there is no requirement that the texture compaction is square, and in fact, the texture compaction can any size or shape desired, including shapes having disconnected sections. In addition, the texture compactions can also be used to construct "Wang tiles" where only a small set of texture tiles is stored instead of a single large texture. As is known to those skilled in the art, Wang tiles are generated and packed into a single texture map, so that the hardware filtering of the packed texture map corresponds directly to the filtering of a virtual texture.

2.5 Real-Time GPU Synthesis:

As noted above, any conventional texture synthesis application that is capable of generating textures from a texture sample is capable of using the texture compactions constructed by the inverse texture synthesis techniques described herein. Further, since the texture compaction tends to be smaller than texture samples computed using conventional techniques for a desired quality level, the use of the texture compaction described herein allows real-time, user controllable synthesis of globally varying patterns. Further, as noted above, rendering or synthesizing textures from the texture compaction produces a visual quality that is similar to the original input texture, especially when a control map is also used. In addition, due to reduced GPU memory access and consumption, rendering from the smaller texture compaction is more efficient than the use of larger texture samples.

In addition to the use of conventional texture synthesis techniques for creating textures using the texture compaction, the texture generator provides several additional techniques for performing real-time globally varying texture synthesis on a GPU.

For example, in one embodiment, the texture generator adapts an existing texture synthesis technique to render textures using the texture compaction. In particular, this embodiment operates with an original control map, provided or computed using conventional means, as an unfiltered input. In addition, the original texture is provided as a filtered input. An output control map is then set as an unfiltered target, with the output texture compaction representing a filtered target to be computed. All synthesis computations are then performed on a GPU where the control map is simply encoded as additional channels beyond the color texture. Note that the control map channels are read-only and not modified during synthesis.

In another embodiment, the texture generator uses a discrete optimization approach by encoding the control map as a constraint in the energy function of Equation (1) and uses a k-coherence solver in place of a least-squares solver, since the k-coherence solver can be efficiently implemented on GPU.

Figure 6:
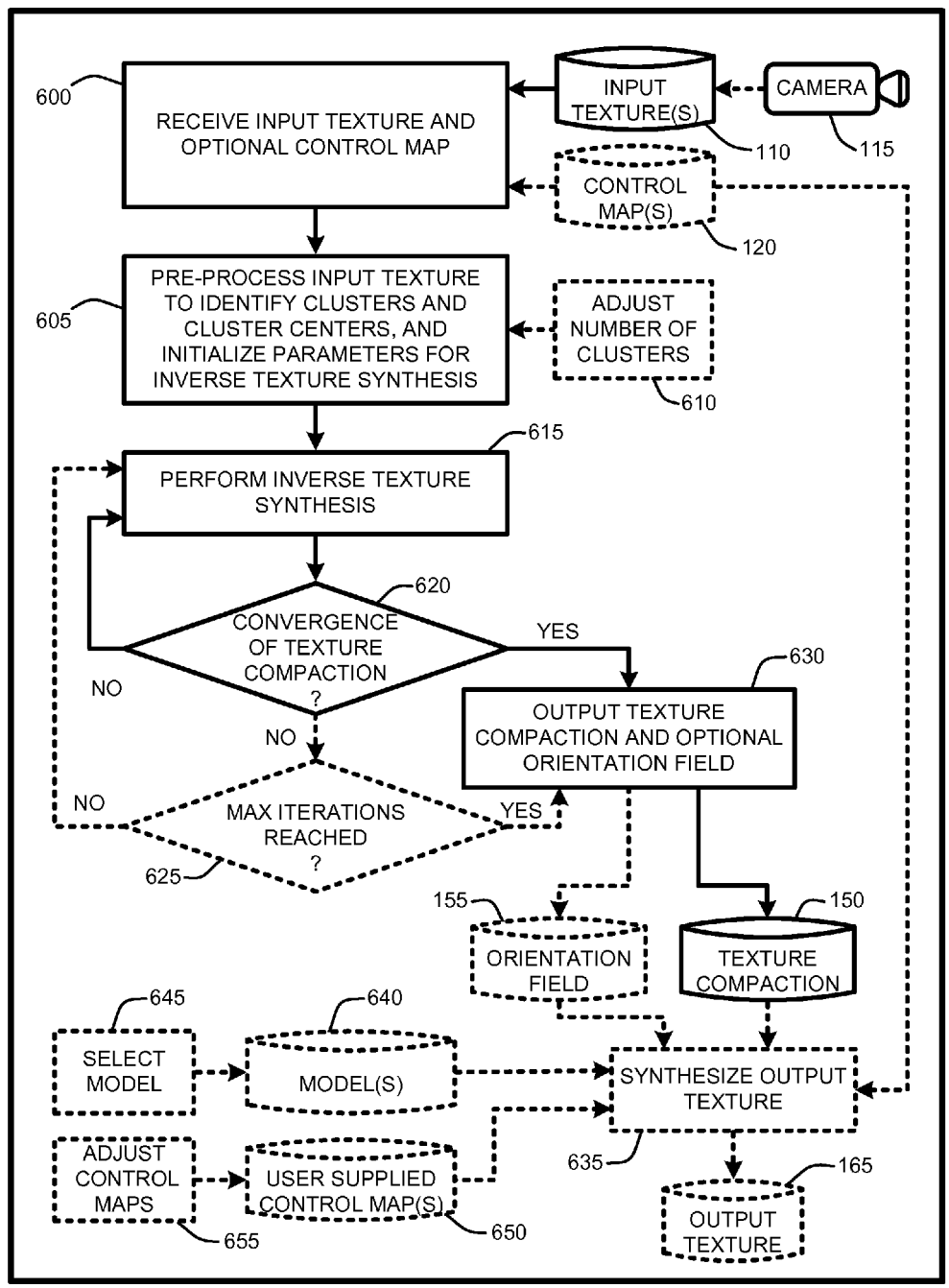
FIG. 6 illustrates a general system flow diagram that illustrates exemplary methods for implementing various embodiments of the texture generator, as described herein.

3.0 Operational Summary of the Texture Generator:

The processes described above with respect to FIG. 1 through FIG. 5 and in further view of the detailed description provided above in Sections 1 and 2 are illustrated by the general operational flow diagram of FIG. 6. In particular, FIG. 6 provides an exemplary operational flow diagram that illustrates operation of some of the various embodiments of the texture generator described above. Note that FIG. 6 is not intended to be an exhaustive representation of all of the various embodiments of the texture generator described herein, and that the embodiments represented in FIG. 6 are provided only for purposes of explanation.

Further, it should be noted that any boxes and interconnections between boxes that are represented by broken or dashed lines in FIG. 6 represent optional or alternate embodiments of the texture generator described herein, and that any or all of these optional or alternate embodiments, as described below, may be used in combination with other alternate embodiments that are described throughout this document.

In general, as illustrated by FIG. 6, the texture generator begins operation by receiving 600 an input texture 110, and optionally, a control map 120 associated with the input texture. As noted above, the input texture 110 can be pre-recorded or pre-rendered and stored on a computer readable medium, or can be provided as an image (or image sequence) from an input device such as a camera 115.

The texture generator then pre-processes 605 the input texture 110 (with optional control map 120) to initialize the parameters to be used for inverse texture synthesis of the output texture compaction 150. In addition, this pre-processing stage 605 also identifies clusters and cluster centers for neighborhoods of pixels in the input texture. Note that the number of clusters is either computed, as described above, or can be set or adjusted 610 via a user interface as a user adjustable input.

Once the initial parameters have been set during the pre-processing stage 605, the texture generator begins the iterative inverse synthesis process 615. As described above in Section 2, the iterative inverse synthesis process 615 uses a modified energy-based expectation-maximization (EM) process to iteratively derive an optimum texture compaction, and optional orientation field. Once the inverse texture synthesis process 615 converges 620 on a solution, or once some maximum number of iterations 625 have been performed, the results of the inverse texture synthesis 615 are output. In particular, as noted above, the inverse texture synthesis outputs 630 the texture compaction 150, and optionally outputs the orientation 155.

Once the texture compaction 150 has been computed, it is stored to a computer-readable medium for use in subsequent renderings or synthesis 635 of output textures 165. In particular, as described above, once the texture compaction 150 is computed, it can be treated like any other 2D texture sample or image that can be used with any conventional texture synthesis technique, conventional or otherwise. For example, in various embodiments, the texture generator uses the texture compaction 150 in combination with one or more of the orientation field 155, control map 120, models 640, and user supplied control maps 650.

Note that in various embodiments, users are provided with a user interface to allows the user to select 645 one or more specific models to be textured using the texture compaction. Further, in additional embodiments, the user is provided with a user interface to adjust 655 the user supplied control maps 650. For example, in various embodiments, the texture generator allows interactive user painting of globally varying textures onto existing images or models (including 2D and 3D models) by combining the generality of example-based texture synthesis with the controllability and flexibility of WYSIWYG-style user painting. For example, to increase an amount of rust along certain regions of a model or image, a user can mouse over, or otherwise designate particular portions of the model or image to indicate that the control map should apply increased levels of rust to the selected areas. The rust is then applied to the model or image via forward synthesis techniques using the texture compaction (computed from an input texture representing rust) in combination with the control map (that was adjusted by user painting of the model or image) to produce an output texture 165 or image.

Figure 7:
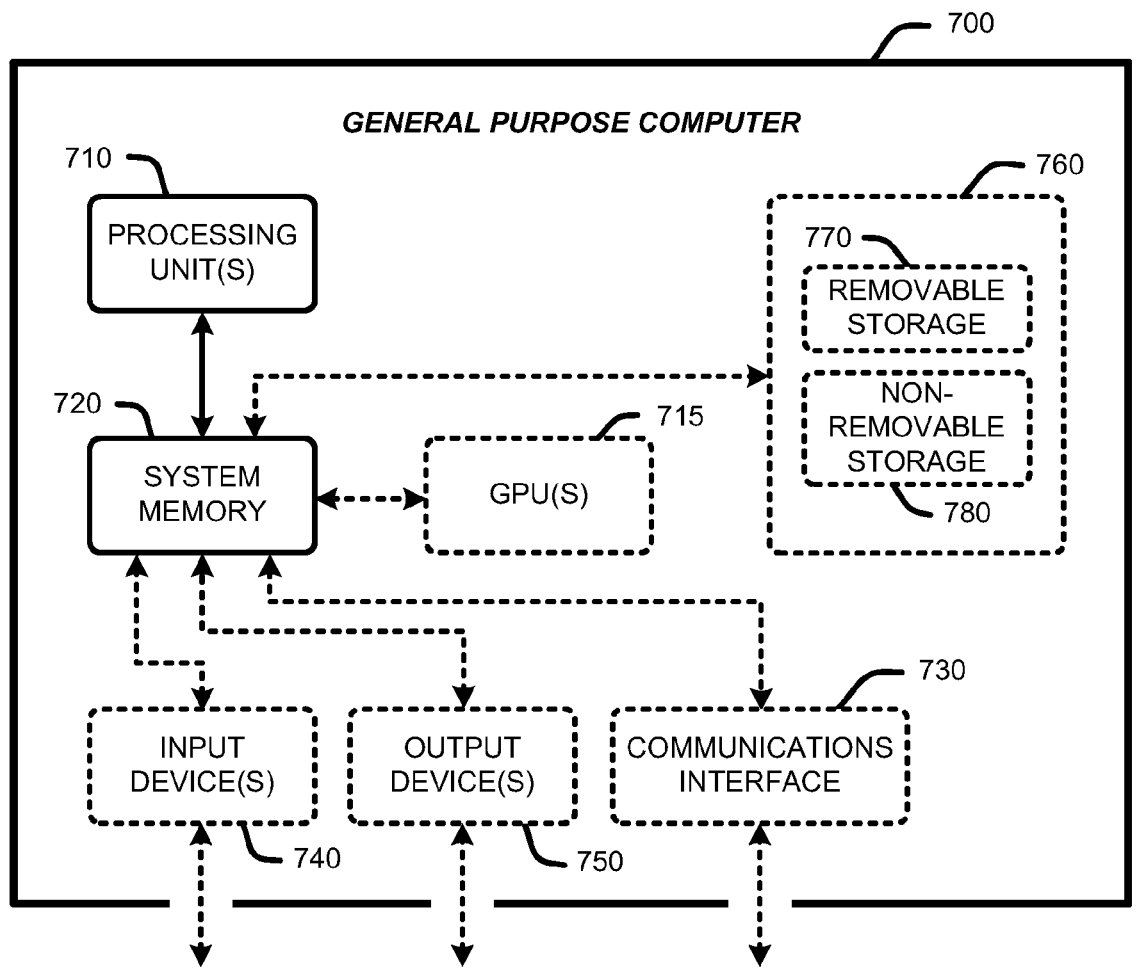
FIG. 7 is a general system diagram depicting a simplified general-purpose computing device having simplified computing and I/O capabilities for use in implementing various embodiments of the texture generator, as described herein.

4.0 Exemplary Operating Environments:

The texture generator is operational within numerous types of general purpose or special purpose computing system environments or configurations. FIG. 7 illustrates a simplified example of a general-purpose computer system on which various embodiments and elements of the texture generator, as described herein, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device 700. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

At a minimum, to allow a device to implement the texture generator, the device must have some minimum computational capability along with some way to access and/or store texture data. In particular, as illustrated by FIG. 7, the computational capability is generally illustrated by one or more processing unit(s) 710, system memory 720, and may also include one or more GPUs 715. Note that that the processing unit(s) 710 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 7 may also include other components, such as, for example, a communications interface 730. The simplified computing device of FIG. 7 may also include one or more conventional computer input devices 740. The simplified computing device of FIG. 7 may also include other optional components, such as, for example one or more conventional computer output devices 750. Finally, the simplified computing device of FIG. 7 may also include storage 760 that is either removable 770 and/or non-removable 780. Note that typical communications interfaces 730, input devices 740, output devices 750, and storage devices 760 for general-purpose computers are well known to those skilled in the art, and will not be described in detail herein.

The foregoing description of the texture generator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the texture generator. It is intended that the scope of the invention be limited not by this detailed description, but rather by the claims appended hereto.

What is claimed is:

1. A method for synthesizing a texture sample from an input texture, comprising steps for:
   receiving an input texture comprising a set of pixels forming an image;
   pre-processing the input texture by a computer device to determine a number of pixel clusters and to identify cluster centers for each cluster;
   setting a size for an output texture compaction;
   initializing pixel values of the output texture compaction using pixels selected from random neighborhoods of the input texture, where each neighborhood represents immediate spatial neighbors of each pixel of the input texture;
   iteratively minimizing an inverse energy function that measures a similarity between each neighborhood of the input texture and a corresponding best matching neighborhood from the output texture compaction to ensure that each neighborhood of the input texture has a presence in the output texture compaction by iteratively assigning pixels from neighborhoods of the input texture to the output texture compaction; and
   outputting an optimized texture compaction that represents a texture sample of the input texture after the inverse energy function has been iteratively minimized.

2. The method of claim 1 wherein iteratively minimizing the inverse energy function includes assigning a best matching pixel value from each neighborhood of the input texture to replace a pixel at the center of the best matching neighborhood of the output texture compaction.

3. The method of claim 1 wherein iteratively minimizing the inverse energy function includes repeating the iterative minimization of the energy function until a value of the energy function changes by less than a predetermined error level from one iteration to the next.

4. The method of claim 1 wherein iteratively minimizing the inverse energy function includes repeating the iterative minimization of the energy function until a maximum number of allowable iterations has been reached.

5. The method of claim 1 wherein setting the size for the output texture compaction includes estimating an optimal size of the texture compaction as a fractional multiple of the number of pixel clusters.

6. The method of claim 1 wherein the size of the output texture compaction is specified via a user interface.

7. The method of claim 1 further including steps for determining an orientation field of the input texture, and wherein the orientation field is used in iteratively assigning the pixels from neighborhoods of the input texture to the output texture compaction when iteratively minimizing the inverse energy function.

8. The method of claim 1 further including steps for applying a forward synthesis technique to the optimized output texture compaction to synthesize an output texture having a similar texture to the input texture.

9. The method of claim 8 wherein a control map is included with the input texture, wherein the control map is used to control the synthesis of the output texture, and wherein the output texture represents a reconstruction of the input texture.

10. A system for constructing a texture sample from an input texture, comprising:
  a device for receiving an image comprising a plurality of pixels;
  a device for determining a number of pixel clusters in the image;
  a device for determining a size for a texture sample;
  a device for initializing pixel values of the texture sample using pixels selected from random neighborhoods of the image, where each neighborhood represents immediate spatial neighbors of each pixel of the image;
  a device for iteratively minimizing an inverse energy function by iteratively assigning pixels from neighborhoods of the image to best matching neighborhoods of the texture sample until convergence of the inverse energy function is reached; and
  outputting the texture sample to a computer-readable storage device after the inverse energy function has been iteratively minimized.

11. The system of claim 10 wherein assigning pixels from neighborhoods of the image to best matching neighborhoods of the texture sample ensures that each neighborhood of the image has a presence in the texture sample.

12. The system of claim 10 wherein iteratively minimizing the inverse energy function includes assigning a best matching pixel value from each neighborhood of the image to replace a pixel at the center of the best matching neighborhood of the texture sample.

13. The system of claim 10 method of claim 1 wherein iteratively minimizing the inverse energy function is terminated after a maximum number of allowable iterations is reached.

14. The system of claim 10 wherein the size of the texture sample is specified via a user interface.

15. The system of claim 10 further including applying a forward synthesis technique to the texture sample to synthesize an output texture having a similar texture to the input texture.

16. A computer-readable storage device having computer executable instructions stored therein for synthesizing a texture compaction from an image representing a texture, said instructions comprising:
  receiving an image;
  determining a number of pixel clusters in the image and identifying a center of each cluster;
  specifying a size for a texture compaction;
  initializing pixel values of the texture compaction using pixels selected from random neighborhoods of the image, where each neighborhood represents immediate spatial neighbors of each pixel of the image;
  iteratively minimizing an inverse energy function that measures a similarity between each neighborhood of the image and a corresponding best matching neighborhood from the texture compaction to ensure that each neighborhood of the image has a presence in the texture compaction;
  wherein iteratively minimizing the inverse energy function includes iteratively assigning a best matching pixel value from each neighborhood of the input texture to replace a pixel at the center of the best matching neighborhood of the output texture compaction; and
  outputting an optimized texture compaction after the inverse energy function has been iteratively minimized.

17. The computer-readable storage device of claim 16 wherein iteratively minimizing the inverse energy function continues until convergence of the inverse energy function is reached relative to an allowable error value.

18. The computer-readable storage device of claim 16 further including applying a forward synthesis technique to the texture compaction to synthesize an output texture having a texture similar to the image.

19. The computer-readable storage device of claim 16 wherein a control map is included with the image, wherein the control map is used to control the synthesis of the output texture, and wherein the output texture represents a synthetic reconstruction of the image.

20. The computer-readable storage device of claim 16 wherein the size of the texture compaction is specified via a user interface.

* * * * *